United States Patent
Monfort et al.

(10) Patent No.: US 11,215,561 B2
(45) Date of Patent: Jan. 4, 2022

(54) METHOD AND DEVICE FOR INCREASING THE SENSITIVITY OF AN IN-LINE MEASUREMENT OF THE SURFACE CLEANLINESS OF STEEL STRIPS

(71) Applicant: Centre de Recherches Metallurgiques ASBL, Brussels (BE)

(72) Inventors: Guy Monfort, Montegnee (BE); Genevieve Moreas, Wanze (BE)

(73) Assignee: CENTRE DE RECHERCHES METALLURGIQUES ASBL, Brussels (BE)

( * ) Notice: Subject to any disclaimer, the term of this patent is extended or adjusted under 35 U.S.C. 154(b) by 588 days.

(21) Appl. No.: 16/322,502

(22) PCT Filed: Aug. 10, 2017

(86) PCT No.: PCT/EP2017/070373
§ 371 (c)(1),
(2) Date: Feb. 1, 2019

(87) PCT Pub. No.: WO2018/041597
PCT Pub. Date: Mar. 8, 2018

(65) Prior Publication Data
US 2021/0381975 A1    Dec. 9, 2021

(30) Foreign Application Priority Data
Sep. 2, 2016  (BE) .................................. 2016/5674

(51) Int. Cl.
*G01N 21/64*    (2006.01)
(52) U.S. Cl.
CPC ... *G01N 21/645* (2013.01); *G01N 2021/6417* (2013.01); *G01N 2021/6463* (2013.01); *G01N 2021/6484* (2013.01)

(58) Field of Classification Search
CPC ......... G01N 21/645; G01N 2021/6417; G01N 2021/6463; G01N 2021/6484
See application file for complete search history.

(56) References Cited

U.S. PATENT DOCUMENTS

| 5,537,206 A | 7/1996 | Akiyoshi et al. |
| 2010/0085567 A1* | 4/2010 | Dottery ................. G01N 21/65 356/301 |

(Continued)

FOREIGN PATENT DOCUMENTS

WO    WO 2009138262 A1    11/2009

OTHER PUBLICATIONS

S. Abdelli-Messaci, et al., „CN emission spectroscopy study of carbon plasma in nitrogen environment, Spectrochimica Acta Part B, vol. 60, Dec. 2005, pp. 955-959, XP27717918A.

(Continued)

*Primary Examiner* — Hugh Maupin
(74) *Attorney, Agent, or Firm* — Leydig, Voit & Mayer, Ltd.

(57) ABSTRACT

A method for automated, in-line measurement of a differentiated surface cleanliness, in terms of carbon, of a continuously-moving metal sheet or strip, having a level of surface carbon pollution lower than 100 mg/m$^2$, includes: generating a radiation beam using a source; focusing the radiation beam using a focusing device such that an energy density deposited on the metal strip or sheet is sufficient to create a plasma and generate CN radicals in the plasma if carbon and nitrogen are present; creating a nitrogen atmosphere around the plasma using a sweeping system with a flow rate that prevents any presence of oxygen from air in the plasma; analyzing light emitted by the plasma using an optical collection device, and redirecting the light toward a spectrometer or device for separating wavelengths of the (Continued)

emitted light; measuring an intensity of an intense vibration line of the CN radical.

10 Claims, 3 Drawing Sheets

(56) References Cited

U.S. PATENT DOCUMENTS

2011/0051994 A1 3/2011 Monfort
2017/0067782 A1* 3/2017 Wang ................... G01J 3/10

OTHER PUBLICATIONS

J. A. Aguilera, et al., "Determination of Carbon Content in Steel using Laser-induced Breakdown Spectroscopy", Applied Spectroscopy, vol. 46, No. 9, Sep. 1992, pp. 1382-1387.
L. Jacobs, et al., Controlling wear and surface cleanliness during cold rolling (LOWWEAR), European Commission, Dec. 2012, pp. 1-158.
E. Almquist, et al., "Practical Experiences with Novel Non-Contact, Online, Surface Cleanliness Measurement System", Galvatech 2015 Proceedings, Dec. 2015, pp. 574-581.
P. Lucena, et al., "New challenges and insights in the detection and spectral identification of organic explosives by laser induced breakdown spectroscopy", Spectrochimica Acta Part B, vol. 66, Dec. 2011, pp. 12-20.
G.M. Bilmes, et al., ,,A real time method for surface cleanliness measurement, Applied Physics B, vol. 82, Jan. 18, 2006, pp. 643-648.
Angel Fernandez-Bravo, et al., ,,Vibrational emission analysis of the CN molecules in laser-induced breakdown spectroscopy of organic compounds, Spectrochimica Acta Part B, vol. 89, Sep. 13, 2013, pp. 77-83.
P.J. Krauth, "Measurement and control of steel sheet cleanliness", La Revue de Métallurgie—CIT, Jul. 2002, pp. 561-568.

* cited by examiner

METHOD AND DEVICE FOR INCREASING THE SENSITIVITY OF AN IN-LINE MEASUREMENT OF THE SURFACE CLEANLINESS OF STEEL STRIPS

CROSS-REFERENCE TO PRIOR APPLICATIONS

This application is a U.S. National Phase application under 35 U.S.C. § 371 of International Application No. PCT/EP2017/070373, filed on Aug. 10, 2017, and claims benefit to Belgium Patent Application No. BE 2016/5674, filed on Sep. 2, 2016. The International Application was published in French on Mar. 8, 2018 as WO 2018/041597 under PCT Article 21(2).

FIELD

The present invention relates to a method for increasing the sensitivity of the in-line measurement of the surface cleanliness of a continuously-moving metal strip or sheet, based on the LIBS (laser-induced breakdown spectroscopy) method.

The invention also relates to a device for implementing the method.

BACKGROUND

When steel sheets are manufactured, the cold rolling process essentially generates two types of impurities on the surface of the sheets: on the one hand, surface carbon, which comes from the breakdown of the rolling oils, and on the other hand, iron fines, the origin of which lies in the interactions with the cylinders used for rolling.

This surface pollution is bothersome, since it requires more frequent cleaning of the cylinders and the stripping baths are polluted more quickly. This obviously incurs additional costs. The dirty sheets must also be annealed for a longer time, which is also more expensive. Furthermore, in the later galvanizing or painting steps, these deposits result in adherence defects that have consequences on the corrosion resistance of the finished products. Lastly, in the annealing furnaces, in particular before galvanizing, the carbonaceous pollution generates soot over time that is deposited on the walls of the furnace, which requires more frequent cleaning. Likewise, the iron fines may accumulate over time on the rollers of the furnace, which may cause flaws on the sheet.

The in-line measurement of this pollution has been subject to several developments in recent years. Presently, the three main methods are:
  a relatively recent method is based on infrared radiation absorption. It is essentially influenced by the surface carbon and fairly little by the iron fines. The sensitivity is limited and there isn't much industrial distance yet (see Krauth P. J., "Contrôle de la propreté des surfaces d'acier", La Revue de Métallurgie—CIT, June 2002);
  another method is based on the analysis of the brightness intensity of a plasma generated on the surface of the sheet by a focused laser beam. Initially, the device was measuring the noise generated by the plasma ("A real time method for surface cleanliness measurement", G. M. Bilmes et al., Appl. Phys. B 82, 643-648, 2006). However, the current system rather measures the overall brightness intensity of the plasma ("Practical Experiences with Novel Non-Contact, Online, Surface Cleanliness Measurement System", E. Almquist, U. Crossa, Proceedings Galvatech 2015). The system is essentially sensitive to the iron fines and relatively little to the carbon pollution;
  lastly, to the knowledge of the inventors, the only device currently allowing in-line measurement of iron fines and surface carbon simultaneously and independently is based on the LIBS method and has been developed by the Applicant in the context of a European research project (Lowwear Project, RFCS Contract No RFSR-CT-2006-00010—1 Jul. 2006 to 31 Dec. 2009). This method, applied to the output of the cold rolling line, measures the level of iron fines by comparing the intensity of two iron lines with different energies. Indeed, the more fine particles there are to supply the plasma, the easier vaporization is and the more energy remains in the laser pulse to excite the atoms of the plasma to a high energy level. To measure the surface carbon, an intense carbon line is used, typically the line at 193 nm. The drawback of this measurement is that the wavelength of this line is in the distant UV and therefore it is absorbed by the oxygen from the air, which reduces the useful intensity during remote measurement. Another sensitive line exists at 247.8 nm, which is not absorbed much, but which is superimposed on an iron line, which makes it difficult to use.

Furthermore, in the modern production of high-quality steels, it is important to guarantee a very high level of surface cleanliness, in particular before galvanizing. To guarantee this, it is typical to clean the surface in degreasing baths in which a chemical solution removes the grime, essentially organic in nature, while one or several brushes allow to rid the sheet of solid pollutants such as iron fines. An in-line analysis method that clearly differentiates the carbon from the iron fines would therefore be interesting, since it would allow not only to evaluate the effectiveness of the degreasing, but also to determine whether a lack of cleanliness is related to a defectiveness of the brushing or to that of the composition of the cleaning solution.

The method proposed by the Applicant (see above) is effective after cold rolling, where the level of carbon pollution is around several milligrams of carbon per square meter. Conversely, after degreasing, this level drops to less than a few several tens of milligrams per square meter and the use of a carbon line partially absorbed by the oxygen from the air is insufficient to guarantee a precise measurement at these cleanliness levels.

Furthermore, it is known from the literature that the carbon present in organic compounds may advantageously be measured by its reaction in a plasma with the atomic nitrogen coming from the air or a gaseous nitrogen atmosphere surrounding the plasma.

This technique has in particular been used to analyze thin deposits of carbon nitrides ("CN emission spectroscopy study of carbon plasma in nitrogen environment", S. Abdelli-Messaci et al., Spectrochimica Acta Part B 60 (2005) 955-959) and for the differentiation of explosives ("New challenges and insights in the detection and spectral identification of organic explosives by laser induced breakdown spectroscopy", P. Lucena et al., Spectrochimica Acta Part B 66 (2011) 12-20).

Furthermore, some studies on organic materials allowed to explain the mechanisms for forming the CN radical in the plasma and to determine the energy densities required to create this type of radical ("Vibrational emission analysis of the CN molecules in laser-induced breakdown spectroscopy of organic compounds", Ángel Fernández-Bravo et al., Spectrochimica Acta Part B 89 (2013) 77-83).

In Aguilera J. A. et al., "*Determination of carbon content in steel using laser-induced breakdown spectroscopy*", Applied Spectroscopy, vol. 46, no. 9 (1992), pages 1382-1387, it is demonstrated that the LIBS method can be used to determine the carbon content in a steel, with a precision and a detection limit that are comparable to those obtained by atom emission spectroscopy. This document further shows that it is necessary to work under a nitrogen or argon atmosphere to prevent the measurement of the C from being influenced by the decomposition of the atmospheric CO2. The calibration curves were obtained by using the ratio of the C line at 193 nm and the Fe line at 201 nm (this Fe line does not interfere with the other lines). It is not possible to use the C line at 248 nm because it interferes with the Fe line at this same wavelength.

Lastly, document WO 2009/138262 A1 provides an in-line and automated method for measuring the cleanliness of a steel strip, consisting of image processing in order to analyze an oxidized ring created on the surface of the strip by a laser or electron beam.

SUMMARY

In an embodiment, the present invention provides a method for automated, in-line measurement of a differentiated surface cleanliness, in terms of carbon, of a continuously-moving metal sheet or strip, having a level of surface carbon pollution lower than 100 mg/m$^2$, the method comprising: generating a radiation beam using a source; focusing the radiation beam using a focusing device such that an energy density deposited on the metal strip or sheet is sufficient to create a plasma and generate CN radicals in the plasma if carbon and nitrogen are present; creating a nitrogen atmosphere around the plasma using a sweeping system with a flow rate configured to prevent a presence of oxygen from air in the plasma; analyzing light emitted by the plasma using an optical collection device, and redirecting the light toward a spectrometer or other device configured to separate wavelengths of the emitted light; measuring an intensity of an intense vibration line of the CN radicals and relating the intensity to that of a vibration line of the nitrogen, in order to compensate for fluctuations linked to the radiation beam and to radiation-material interactions, the intense vibration line of the CN radicals being a vibration line at 388.25 nm and the vibration line of the nitrogen being the vibration line at 500.51 nm; and using an obtained ratio to characterize the surface cleanliness of the metal strip or sheet, in terms of carbon pollution.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
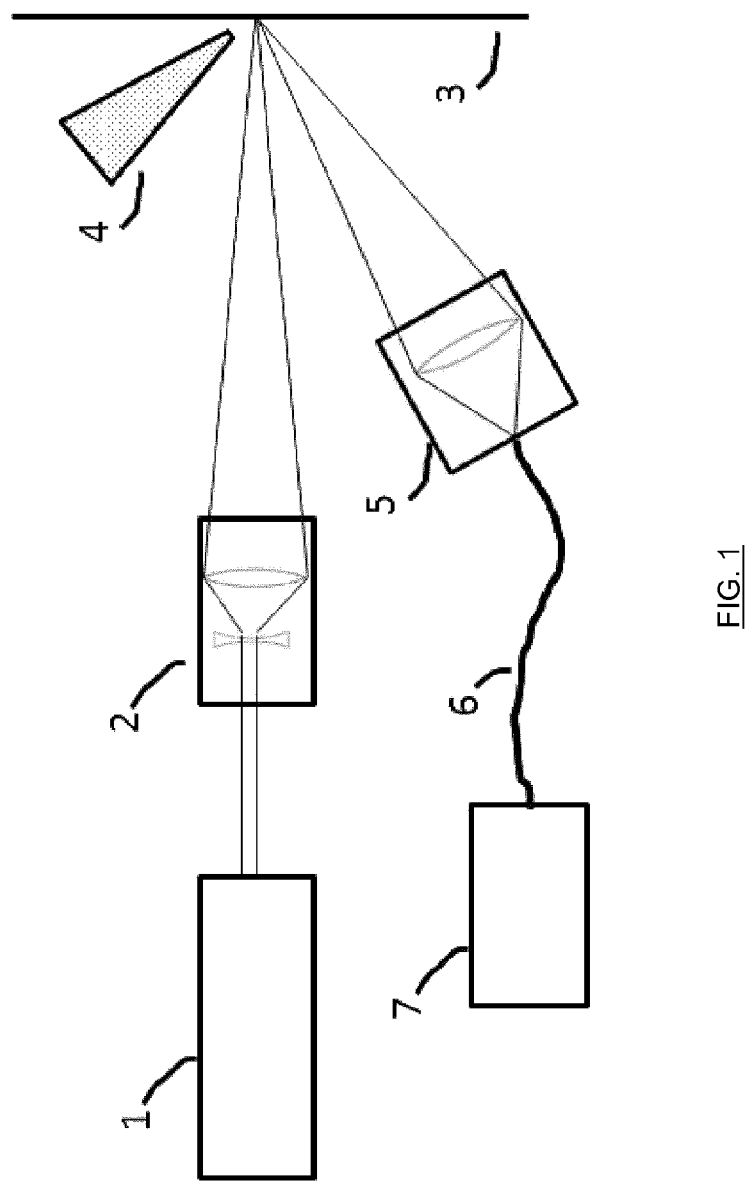
FIG. 1 shows a basic diagram of the device used according to the present invention, showing the main elements such as the radiation source, the focusing lens, the moving strip or sheet, the system for bringing nitrogen around or near the plasma, the light-collection device and the analysis spectrometer.

In an embodiment, the present invention provides a method for measuring the surface cleanliness of a continuously-moving metal strip or sheet obtained by cold rolling at the exit of degreasing lines. It involves allowing to separately measure the surface carbon and iron fine pollution, which is only possible in the current state of the art upon leaving the cold rolling line, where the pollution levels are significantly higher.

In an embodiment, the present invention also provides a device allowing to achieve the desired precision in measuring the surface cleanliness of steel sheets leaving degreasing lines.

A first aspect of the invention relates to a method for the automated, in-line measurement of the differentiated surface cleanliness, in terms of carbon pollution, of a continuously-moving metal sheet or strip, having a level of surface pollution lower than 100 mg/m$^2$, preferably lower than 50 mg/m$^2$, characterized by the following steps:

a radiation beam is generated using a source;

the radiation beam is focused using the focusing device such that the density of the energy deposited on the metal strip or sheet is sufficient to create a plasma and to generate CN radicals in the plasma if the latter contains carbon and nitrogen;

a nitrogen atmosphere is created around the plasma, using a sweeping system with a flow rate that can prevent any presence of oxygen from the air in the plasma;

the light emitted by the plasma is analyzed using an optical collection device and is reoriented toward a spectrometer or any other means for separating wavelengths of the emitted light;

the intensity of an intense vibration line of the CN radical is measured and is related to that of a vibration line of the nitrogen, in order to compensate for the fluctuations linked to the radiation beam and to the radiation—material interactions, the intense vibration line of the CN radical being the vibration line at 388.25 nm and the vibration line of the nitrogen being the vibration line at 500.51 nm, and the obtained ratio is used to characterize the surface cleanliness of the metal strip or sheet in terms of carbon pollution.

Preferred embodiments of the method according to the invention further include one or more of the following features, in combination:

said radiation beam is a laser beam or an electron beam;

the desired density of energy on the strip or sheet surface is obtained owing to a laser beam with an appropriate power and focal diameter, the beam being focused on said surface either directly, or by focusing improved by an optical expansion device before the beam;

the laser is a pulsed laser, said laser and the focusing device being chosen to create a density of energy on the surface of the metal strip or sheet of between 10 and 100 GW/cm$^2$ and preferably of between 30 and 60 GW/cm$^2$;

the optical collection device is a plurality of lenses or mirrors or even a combination of the two that image the plasma at the end of an optical fiber, which in turn redirects the light beam toward the spectrometer or another means for separating the wavelengths of the emitted light;

the metal strip or sheet is a steel strip;

the motion speed of the metal strip or sheet (3) is greater than 0.5 m/s;

the method is used in the case of a cold rolling line and after passage in a degreasing bath.

Another aspect of the invention relates to a device for the in-line, automated measurement of the surface cleanliness of a continuously-moving metal strip or sheet, characterized in that it comprises:

a pulsed laser, generating a beam with a diameter of between 0.5 and 10 mm, in the form of pulses with a duration of between 0.5 and 15 ns, with an energy of between 1 and 300 mJ per pulse, in order to generate a plasma on the surface of the metal strip or sheet;

a focusing device allowing to expand a beam by a factor of between 2 and 10 and allowing to focus the beam on the metal strip or sheet at a distance of between 10 and 200 cm;

a nitrogen sweeping system in the vicinity of the plasma on this metal strip or sheet with a flow rate that can prevent any presence of oxygen from the air in the plasma;

an optical collection device comprising a plurality of lenses, mirrors or a combination of the two, to image the light emitted by the plasma on an optical fiber;

an optical fiber;

a spectrometer connected to the optical fiber;

a spectrum analyzer allowing to calculate the ratio of the intensity of the vibration line of the carbon at 388.25 nm and the vibration line of the nitrogen at 500.51 nm.

The method and the device proposed according to the present invention improve the method and the device described in the prior art for analyzing by LIBS the surface cleanliness in terms of carbon of moving metal strips and sheets, for example made from steel. The described method is based on the measurement of lines of CN radicals, which is known in the literature but, to the knowledge of the inventors, has never been implemented to improve the measurement of the surface cleanliness of metal strips or sheets.

The improvement principle is described below, with one example embodiment.

As shown in FIG. 1, the beam of a laser 1, preferably pulsed, is focused using an appropriate optical device 2, on the surface of the metal strip or sheet 3 in motion. The power of the laser and the focal diameter are advantageously chosen such that the power density obtained on the sheet is sufficient to create a plasma on the surface of the sheet. Furthermore, and in addition to common practice, the energy from the laser pulses and the focusing device are chosen so as to create an energy density of between 10 and 100 $GW/cm^2$, ideally between 30 and 60 $GW/cm^2$ so as to generate CN radicals in the presence of nitrogen and carbon.

As an example, such an energy density can be obtained by means of a laser, generating a beam with a diameter of 3 mm, in the form of pulses lasting 8 ns and with an energy of 50 mJ per pulse, associated with an optical device that causes the beam to expand by a factor of 8, then focuses said beam at a distance of 30 centimeters. Under these conditions, a focal point is obtained with a diameter of 150 µm and a power density of about 35 $GW/cm^2$.

The zone near the sheet where the plasma is created is subjected to sweeping with nitrogen 4 so as to obtain CN radicals in the presence of surface carbon pollution while preventing part of said carbon from reacting with the oxygen from the air.

The light emitted by the plasma is next collected by a set of lenses 5 that image the plasma over the end of an optical fiber 6, which in turn redirects the light toward an analysis device such as a spectrometer 7.

The method according to the invention then uses the vibration line (0-0), or any other appropriate line, of the CN radicals, created optimally by choosing the device described above. The intensity of this line is advantageously related to a nitrogen line (in that the ratio of their respective intensities is obtained), preferably the line at 500.51 nm, which is intense enough and which has few interferences with other elements. This ratio allows to eliminate fluctuations of the overall light intensity of the plasma related, for example, to the variations in the intensity of the laser beam or the radiation-material coupling. Typically, an iron line is used for reference on steel. However, in the case of surface cleanliness measurements, the presence of iron fines causes relative variations in the intensity of the iron lines, based on the energy necessary to create them. The use of an iron line is therefore less reliable than that of the nitrogen that will be more stable in light of the nitrogen saturation around the plasma due to the use of the device for sweeping with nitrogen 4.

Figure 2:
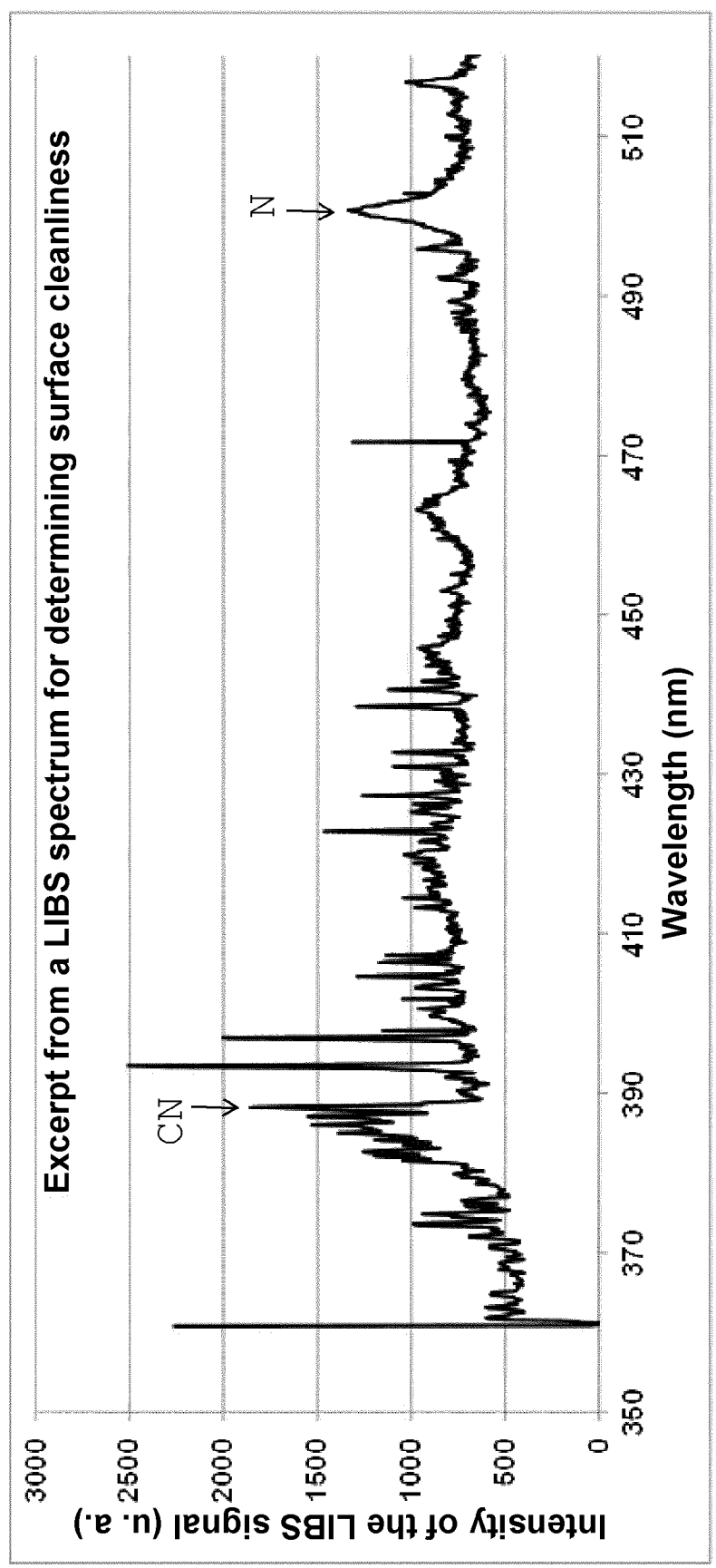
FIG. 2 shows an example spectrum with the specific CN and N lines used to determine the surface carbon pollution.

FIG. 2 provides an example spectrum, chosen on a sheet before degreasing to clearly show the lines used to apply the method according to the invention.

Figure 3:
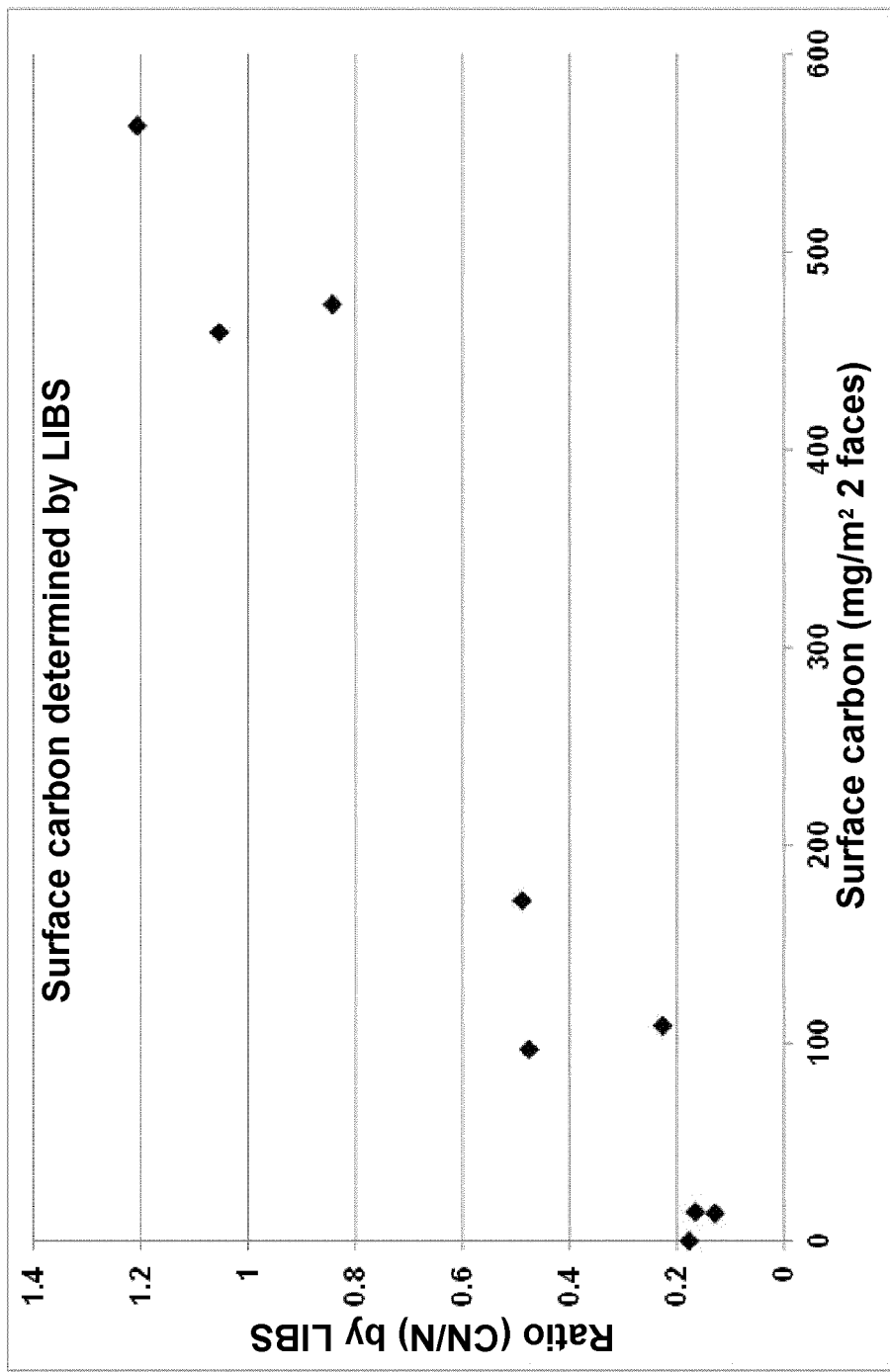
FIG. 3 shows, in one example, a comparison between the measurements according to the method and with the device of the invention and the measurements in the laboratory using a reference method (combustion method).

FIG. 3 provides an example comparison between the measurements using the method and the device according to the invention on the one hand, and the results of analyses by a laboratory reference method (combustion method). The different cases correspond to three different steels analyzed under the following conditions (being three groups of three points going from right to left in FIG. 3):

upon leaving the rolling mill;

after partial degreasing on a pilot line for continuous degreasing of the Applicant;

after more intensive degreasing, varying depending on the tested steel, obtained by two successive passages on the same pilot degreasing line.

It can thus be seen that the method according to the invention allows to discriminate surface pollution levels varying from the state upon leaving cold rolling up to very low pollution levels.

Advantages of the Method

This method has the advantage of determining the surface carbon pollution using a CN line whose measurement conditions (laser energy coupled with the focusing device, nitrogen sweeping) optimize the intensity.

Using the CN line located in the near UV allows to emancipate from the absorption by the oxygen from the air, unlike the intense carbon line at 193 nm.

The nitrogen atmosphere created around the plasma prevents the formation of an oxide layer around the impact zone of the laser after the extinction of the plasma. The formation of this oxide could, disadvantageously, locally modify the thermal emissivity of the sheet and very locally change the absorption of thermal energy during the passage in the furnaces, before galvanizing, for example.

All of these advantages, which are significant in themselves, result in an increased sensitivity for the analysis of the surface carbon pollution of the metal strips and sheets.

This therefore allows to take significant measurements not only upon leaving cold rolling, but also upon leaving the degreasing bath.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for automated, in-line measurement of a differentiated surface cleanliness, in terms of carbon, of a continuously-moving metal sheet or strip, having a level of surface carbon pollution lower than 100 mg/m$^2$, the method comprising:
   generating a radiation beam using a source;
   focusing the radiation beam using a focusing device such that an energy density deposited on the metal strip or sheet is sufficient to create a plasma and generate CN radicals in the plasma if carbon and nitrogen are present;
   creating a nitrogen atmosphere around the plasma using a sweeping system with a flow rate configured to prevent a presence of oxygen from air in the plasma;
   analyzing light emitted by the plasma using an optical collection device, and redirecting the light toward a spectrometer or other device configured to separate wavelengths of the emitted light;
   measuring an intensity of an intense vibration line of the CN radicals and relating the intensity to that of a vibration line of the nitrogen, in order to compensate for fluctuations linked to the radiation beam and to radiation material interactions, the intense vibration line of the CN radicals being a vibration line at 388.25 nm and the vibration line of the nitrogen being the vibration line at 500.51 nm; and
   using an obtained ratio to characterize the surface cleanliness of the metal strip or sheet, in terms of carbon pollution.

2. The method of claim 1, wherein the radiation beam comprises a laser beam or an electron beam.

3. The method of claim 1, wherein a desired energy density on the strip or sheet surface is obtained owing to a laser beam with an appropriate power and focal diameter, the beam being focused on the strip or sheet surface either directly, or by focusing improved by an optical device for a prior expansion of the beam.

4. The method of claim 3, wherein the laser comprises a pulsed laser, the pulsed laser and the focusing device being configured to create an energy density on the surface of the metal strip or sheet of between 10 and 100 GW/cm$^2$.

5. The method of claim 4, wherein the energy density on the surface of the metal strip or sheet is between 30 and 60 GW/cm$^2$.

6. The method of claim 1, wherein the optical collection device comprises a plurality of lenses or mirrors or a combination thereof that image the plasma on an end of an optical fiber, which in turn redirects the light beam toward the spectrometer or device configured to separate the wavelengths of the emitted light.

7. The method of claim 1, wherein the metal strip or sheet comprises a steel strip.

8. The method of claim 1, wherein a motion speed of the metal strip or sheet is greater than 0.5 m/s.

9. The method of claim 1, wherein the method is used in a cold rolling line and after passage through a degreasing bath.

10. A device for the in-line, automated measurement of the surface cleanliness of a continuously-moving metal strip or sheet, comprising:
   a pulsed laser configured to generate a beam with a diameter of between 0.5 and 10 mm, in the form of pulses with a duration of between 0.5 and 15 ns, with an energy of between 1 and 300 mJ per pulse, so as to generate a plasma on a surface of the metal strip or sheet;
   a focusing device configured to expand a beam by a factor of between 2 and 10 to focus the beam on the metal strip or sheet at a distance of between 10 and 200 cm;
   a nitrogen sweeping system in a vicinity of the plasma on the metal strip or sheet with a flow rate configured to prevent a presence of oxygen from air in the plasma;
   an optical collection device comprising a plurality of lenses, mirrors, or a combination thereof, configured to image light emitted by the plasma on an optical fiber;
   the optical fiber;
   a spectrometer connected to the optical fiber; and
   a spectrum analyzer configured to calculate a ratio of an intensity of a vibration line of carbon at 388.25 nm and of a vibration line of nitrogen at 500.51 nm.

* * * * *